United States Patent
Schmatz et al.

(10) Patent No.: US 10,931,443 B2
(45) Date of Patent: Feb. 23, 2021

(54) HIERARCHICAL KEY MANAGEMENT BASED ON BITWISE XOR OPERATIONS

(71) Applicant: International Business Machines Corporation, Armonk, NY (US)

(72) Inventors: Martin Schmatz, Rueschlikon (CH); Navaneeth Rameshan, Zurich (CH); Yiyu Chen, Thalwil (CH); Patricia M. Sagmeister, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 16/111,194

(22) Filed: Aug. 23, 2018

(65) Prior Publication Data
US 2020/0067698 A1  Feb. 27, 2020

(51) Int. Cl.
*H04L 29/06* (2006.01)
*H04L 9/08* (2006.01)
*G06F 7/58* (2006.01)

(52) U.S. Cl.
CPC ............... *H04L 9/08* (2013.01); *G06F 7/582* (2013.01); *H04L 9/0877* (2013.01); *H04L 9/0894* (2013.01); *H04L 2209/38* (2013.01)

(58) Field of Classification Search
CPC ........ H04L 9/0877; H04L 9/08; H04L 9/0894
See application file for complete search history.

(56) References Cited

U.S. PATENT DOCUMENTS 9,465,947 B2   10/2016 Nakhjiri
9,544,140 B1 *  1/2017 Bhatia .................. H04L 9/34
(Continued)

FOREIGN PATENT DOCUMENTS

CN       104993926 A    10/2015
WO       2016/178919 A  11/2016

OTHER PUBLICATIONS

Shaohua Tang, et al., Achieving Simple, Secure and Efficient Hierarchical Access Control in Cloud Computing, Sep. 17, 2015, IEEE Transactions on Computers, vol. 65, Issue 7, pp. 2325-2331.

(Continued)

*Primary Examiner* — Dao Q Ho
(74) *Attorney, Agent, or Firm* — Daniel P. Morris, Esq.; Hoffmann & Baron, LLP

(57) ABSTRACT

A computer-implemented method manages cryptographic objects in a hierarchical key management system including a hardware security module (HSM), which institutes a key hierarchy extending from a ground level $l_0$. Clients interact with the HSM to obtain cryptographic objects. A request is received from one of the clients for an object at a given level $l_n$ of the hierarchy (above the ground level $l_0$). A binary representation of the object is accessed as a primary bit pattern $p_0$, at the HSM and said pattern is scrambled via a bitwise XOR operation. The latter operates, on the one hand, on the primary bit pattern $p_0$ and, on the other hand, on a control bit pattern $p_c$ that is a binary representation of an access code of the same length as said primary bit pattern $p_0$. The pattern $p_c$ is obtained based on that given level $l_n$ of the hierarchy.

19 Claims, 5 Drawing Sheets

(56) References Cited

U.S. PATENT DOCUMENTS

| | | | |
|---|---|---|---|
| 10,476,663 B1* | 11/2019 | Lazier | H04L 9/3278 |
| 2009/0204824 A1* | 8/2009 | Lin | G11B 20/0021 |
| | | | 713/193 |
| 2015/0186657 A1* | 7/2015 | Nakhjiri | H04L 9/0894 |
| | | | 713/155 |
| 2018/0262341 A1* | 9/2018 | Cheng | H04L 9/0877 |

OTHER PUBLICATIONS

Martin Hentschel et al., Encryption Key Management in Snowflake, Sep 18, 2015, downloaded from website https://www.snowflake.net/encryption-key-management-in-snowflake/, 8 pages.

Yingjie Xia et al., Hierarchy-Aware ECC Model for Cloud, Sep. 7, 2010, Industrial and Information Systems (IIS), 2010 2nd International Conference on, vol. 1, pp. 468-471. IEEE, 2010.

AWS Key Management Service Cryptographic Details, White Paper published Aug. 2016, 42 pages.

\* cited by examiner

HIERARCHICAL KEY MANAGEMENT BASED ON BITWISE XOR OPERATIONS

BACKGROUND

The invention relates in general to the field of computer-implemented methods for managing cryptographic objects in a in a hierarchical key management system that comprises one or more hardware security modules (HSMs) interacting with computerized clients, as well as related computerized systems and computer program products.

Key management relates to the management of cryptographic keys in a cryptosystem, which involves operations such as the generation, storage, use, destruction and replacement of keys. Key management requires specific cryptographic protocols, key servers, and other procedures.

Consistently, a key management system (KMS) is a system that generates, distributes and, more generally, manages cryptographic keys for clients (devices, applications). A KMS may handle several aspects of security, these ranging from secure generation of keys up to secure key handling and storage on the clients. A KMS typically includes a backend functionality for key generation, distribution, and replacement. It may further integrate specific client functionalities for injecting keys, storing and managing keys on the client devices.

Key management and key management systems are becoming increasingly important for the security of connected devices and applications with the development of the Internet of Things and cloud computing.

Hardware security modules (HSMs) are physical computing devices that protect and manage keys for performing cryptographic operations (i.e., crypto-processing) and strong authentication. Such modules are physical devices (e.g., plug-in cards) that typically attach directly to a computer (e.g., a network server).

HSMs typically comprise secure crypto-processor chips to prevent tampering and bus probing. In general, HSMs may be designed to provide tamper evidence and tamper resistance (e.g., to delete keys upon tamper detection). HSM systems are sometimes able to securely back up keys they manage. HSMs are typically clustered to provide high availability and, as such, conform to high-availability requirements of modern data center environments. They may notably form part of infrastructures such as online banking applications and public key infrastructures.

Amongst other functions, an HSM may rely on specific hardware, which typically exploits a physical process, to create a sufficient source of randomness (characterized by entropy). The available randomness is, in turn, used to generate random keys.

A hierarchical key management system (HKMS) is a KMS that relies on a key hierarchy extending from a ground level $l_0$ (typically corresponding to a master key, residing in plain form only inside an HSM). As per the key hierarchy, a key of a deeper key hierarchy level (assuming the master key on the ground level) is used to encrypt/wrap or decrypt/unwrap a key for an upper key hierarchy level. For example, the master key may be used to wrap/unwrap so-called "tenant" keys on a next level, while the tenant keys are used to wrap/unwrap so-called "project" keys on a further level. Project keys, in turn, are used to encrypt/decrypt data.

An HKMS allows for 'bulk-deletions': If the key for a given hierarchy tree branch is deleted or invalidated, all data in that hierarchy branch cannot be decrypted anymore (such data can be said to be pseudo deleted). All the more, an HKMS offers multiplied security, inasmuch as each level of the hierarchy tree is protected with its own (encrypted) key. For N hierarchy levels, N-1 decrypt/unwrap operations are required, which would have to be determined (cracked) to enable (rogue) access to the data.

SUMMARY

According to a first aspect, the present invention is embodied as a computer-implemented method for managing cryptographic objects in a hierarchical key management system. The system comprises a hardware security module (hereafter HSM), which institutes a key hierarchy extending from a ground level $l_0$ of this hierarchy. The system enables clients to interact with the HSM in order to obtain cryptographic objects. Basically, the method involves the following steps. Assume that a request is received from one of the clients, according to which request a cryptographic object is to be provided at a given level $l_n$ of the hierarchy (above the ground level $l_0$). Then, a binary representation of a cryptographic object is accessed as a primary bit pattern $p_0$, at the HSM and said primary bit pattern is scrambled via a bitwise XOR operation, in order to serve the request received. The latter operates, on the one hand, on the primary bit pattern $p_0$ accessed and, on the other hand, on a control bit pattern $p_c$ that is a binary representation of an access code of a same length as said primary bit pattern $p_c$. Said control bit pattern $p_c$ is obtained based on that given level $l_n$ of the hierarchy.

In embodiments, a scrambled bit pattern $p_s$ may similarly need be unscrambled (again via a bitwise XOR operation), to serve a client request.

According to another but related aspect, the invention is embodied as a computerized system for managing cryptographic objects. The system comprises an HSM (at a ground level $l_0$ of the hierarchy instituted by the system) and is designed to enable clients to interact with the HSM in order to obtain such cryptographic objects. The system is otherwise configured to perform steps such as described above, i.e., receive a client request, according to which a cryptographic object is to be provided at a given level $l_n$ of the hierarchy (above the ground level $l_0$), access a binary representation of a cryptographic object as a primary bit pattern $p_0$, and scramble said primary bit pattern via a bitwise XOR operation to serve the request received.

In embodiments, wherein the system comprises two or more HSMs, each at a ground level $l_0$ of respective hierarchies (or hierarchical paths in a hierarchy) of the system. In such cases, the above steps can be performed (e.g., concurrently) for each of said respective hierarchies of the system.

According to a final aspect, the invention is embodied as a computer program product for managing cryptographic objects in a hierarchical key management system such as described above (the system comprises at least one HSM at a ground level $l_0$ of its hierarchy and otherwise enables clients to interact with the HSM in order to obtain cryptographic objects). The computer program product comprises a computer readable storage medium having program instructions embodied therewith. Such program instructions are executable by one or more processors, to cause to take steps according to the methods described herein.

Computerized systems, methods, and computer program products embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Similar or functionally similar elements in the figures have been allocated the same numeral references, unless otherwise indicated.

DETAILED DESCRIPTION OF EMBODIMENTS OF THE INVENTION

In a hierarchical system as described in the background section, each time a data encryption key (DEK) is needed for an operation (and hence need be available in plain form), all branch access keys need be unwrapped, which implies multiple unwrap operations. This is a sequential process: the keys of any level can only be processed once the key of the previous level is available in plain form. This implies that the keys of all previous levels need be available in plain, which results in a severe performance penalty (HSMs typically involves long latencies, on the order of the millisecond to perform any wrap/unwrap operation).

Therefore, the present Inventors have devised novel techniques, wherein binary representations of cryptographic objects (COs) are scrambled (or unscrambled) via an efficient operation, which operation yet depends on the hierarchy instituted by the system. Such techniques can be embodied as methods, systems and computer program products, which concern distinct but related aspects of the invention, as described in detail in the following description, which is structured as follows. First, general embodiments and high-level variants are described (sect. 1). The next section addresses more specific embodiments and technical implementation details (sect. 2).

1. General Embodiments and High-Level Variants

Figure 1:
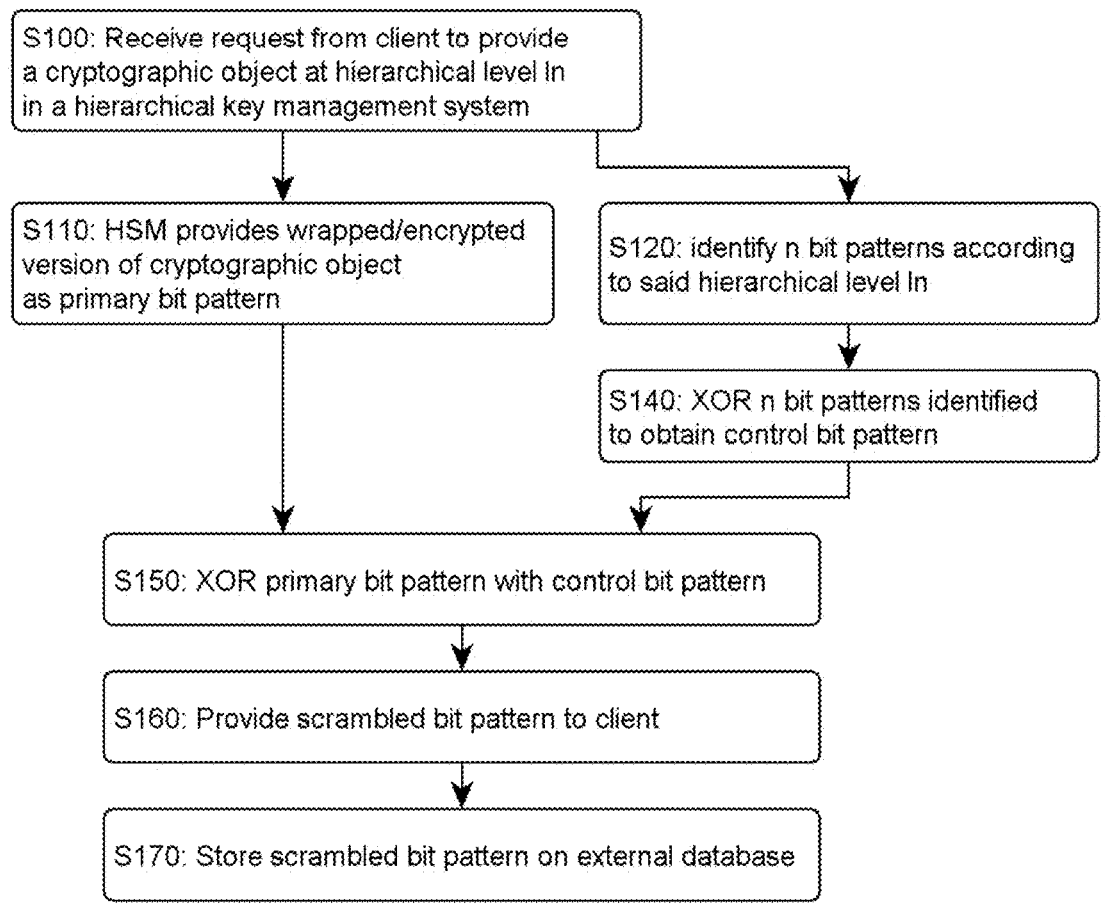
FIG. 1 is a flowchart illustrating high-level steps of a method for managing cryptographic objects in a hierarchical key management system, whereby a binary representation of a cryptographic object is accessed as a primary bit pattern $p_0$, which is then scrambled via a bitwise XOR operation, in order to serve a client request, as in embodiments.
Figure 5:
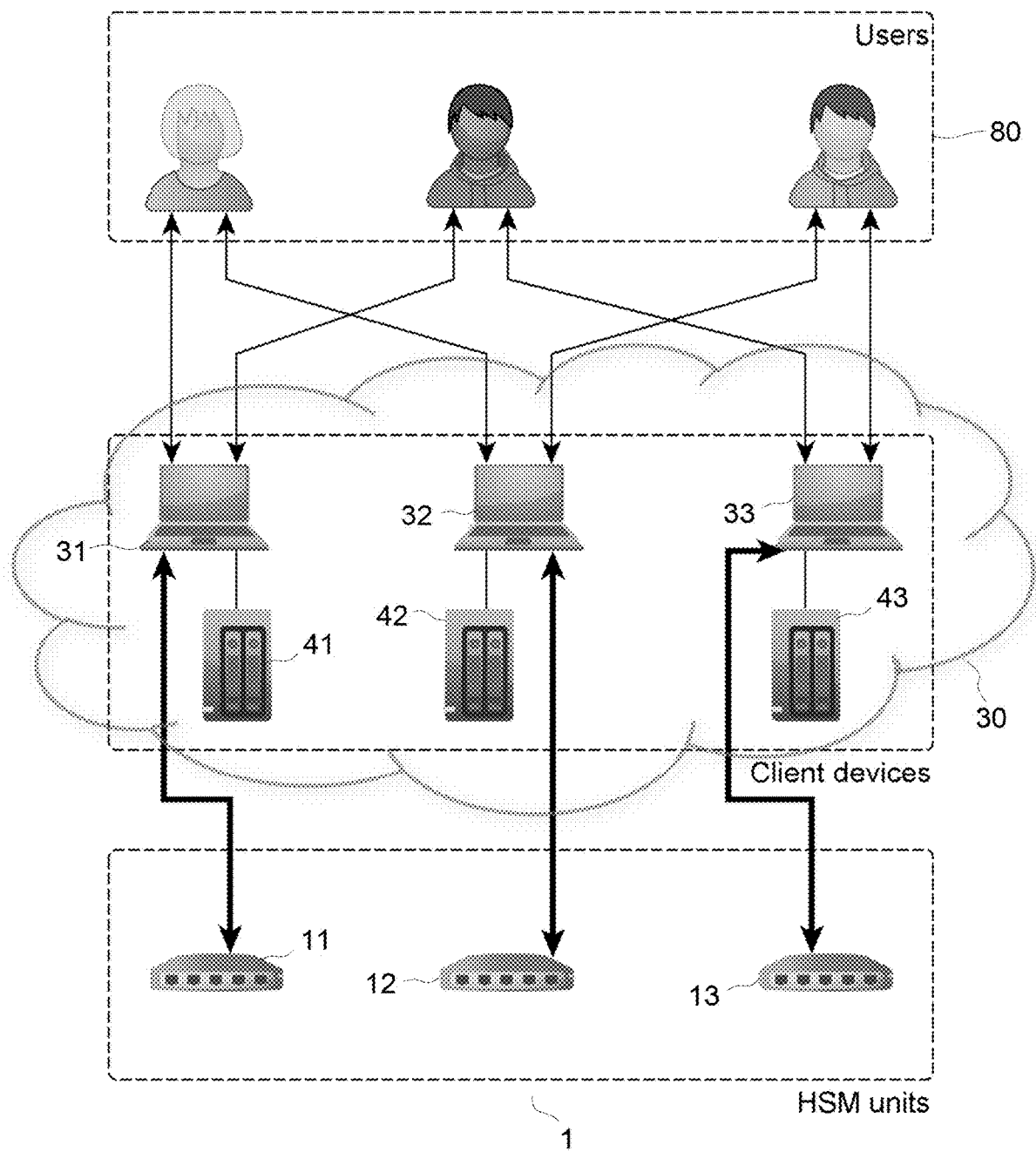
FIG. 5 schematically represents selected components and actors of a key management system, where clients interact with HSMs on behalf of users, and where clients operate in a cloud, as in embodiments.

In reference to FIGS. 1, 2, a first aspect of the invention is described, which concerns a computer-implemented method for managing COs in a hierarchical key management system 1 (or HKMS in the following), such as depicted in FIG. 5.

This HKMS notably comprises a hardware security module 11 (or HSM), which institutes a key hierarchy extending from a ground level $l_0$ of this hierarchy. The HSM 11 (or rather, the master key residing in plain form therein) can be considered to be the unique member at the ground level $l_0$ of the key hierarchy it institutes, if higher-level keys are (meant to be) stored (in wrapped form) outside the HSM. I.e., this hierarchy can be regarded as an arborescence, defining a rooted tree that extends from the ground-level (e.g., corresponding to the master key) to higher key levels in the hierarchy, as simply exemplified in FIG. 4, where keys 111-113 define three hierarchical levels. With this definition, a lower-level key is closer to the master key level than a higher-level key. Of course, a master key may equivalently be regarded as sitting on top of a respective hierarchy, in which case a higher-level key would be considered to be closer to the master key level. That is, the master key may equally well be regarded as the hierarch, i.e., on top of the downward hierarchy it institutes. In the following description, however, a master key is assumed to be the unique member at the ground level of its hierarchy, for the sake of description. Now, we note that the hierarchy may in fact be multidimensional, whereby several hierarchical paths (or hierarchies) may possibly be involved, each extending from master key levels of respective HSMs, as discussed later in detail.

The HKMS is otherwise designed to enable clients 31-33 to interact with the HSM 11 in order for the clients to obtain COs, which typically consists of cryptographic keys (e.g., wrapped keys) and/or initialization vectors (IVs). The clients 31-33 may for instance be implemented in a cloud 30, e.g., as containers, virtual machines, or respective computer devices. Such clients may typically interact with HSMs 11-13 of the system 1 on behalf of users 80 that otherwise interact (computationally speaking) with the clients 31-33.

Assume that a request is received (step S100, FIG. 1) from one of the clients, according to which request a CO is to be provided at a given level $l_n$ of the key hierarchy, above the ground level $l_0$.

Then, a binary representation of this CO is accessed (step S110) at the HSM 11. This binary representation is accessed in the form of a bit pattern, which is referred to as a primary bit pattern $p_0$ in the following.

Next, this primary bit pattern is scrambled (step S150) via a bitwise XOR operation, which depends on the hierarchical level $l_n$ at which the CO is to be provided, in order to serve S160-S170 the request received at step S100. In more detail, the bitwise XOR operation operates, on the one hand, on the primary bit pattern $p_0$ accessed at step S110 and, on the other hand, on a control bit pattern $p_c$, where the control bit pattern $p_c$ depends on the hierarchical level $l_n$ at which the CO is to be provided. Several possibilities can be contemplated, which allows the access code $p_c$ to be obtained based on that given level $l_n$, as exemplified later.

This control bit pattern $p_c$ is, intrinsically, a binary representation of an access code. Importantly, this access code is here determined so as for it to have the same length as the primary bit pattern $p_0$. Thus, the bitwise XOR function (also noted "⊕", see below) operates on two bit patterns of equal length, to thereby perform the logical exclusive OR operation. I.e., this function operates on each pair of corresponding bits in each of the patterns, as known per se.

The present scheme differs from classical multi-encryption/multi-wrap processes as implemented in usual HKMSs. That is, this process does not require all branch access keys to be unwrapped to perform a requested operation. Still, the chosen approach allows for 'bulk-deletions'. Namely, if the access code for a given hierarchy tree branch is deleted or invalidated, all data in that hierarchy branch cannot be decrypted anymore. All the more, the present approach allows the number of operations required from the HSM to be reduced.

While, depending on the sophistication of the scheme involved, some operations may still be required at the HSM (e.g., to unwrap a key and/or perform some encryption/decryption process), the scrambling operation S150 itself will normally be performed independently from any key residing in plain form in the HSM (at least after the initial object has been accessed at step S110). That is, the process may go through as few encryption/wrap stages along the hierarchy as possible. Meanwhile, scrambled (and possibly encrypted) versions of the COs can be provided to requesting clients, e.g., in view of storing such COs outside of the HSMs 11-13, so as to save space on the HSMs.

Note, the XOR operation is easily reversible. For example, given two equal-length bit patterns $\pi_1=\{1, 0, 1, 1, 0\}$ and $\pi_2=\{1, 1, 0, 1, 0\}$, one obtains $\pi_1 \oplus \pi_2 = \pi_2 \oplus \pi_1 = \pi_3 = \{0, 1, 1, 0, 0\}$, where the bitwise XOR function nicely satisfies the following properties: $\pi_1 \oplus \pi_3 = \pi_2$ and $\pi_2 \oplus \pi_3 = \pi_1$. I.e., should a client request to store or otherwise provide a scrambled, encrypted object on to the HSM, then a corresponding, primary bit pattern $p_0$ can easily be restored by XORing the scrambled bit pattern $p_s$ provided. The pattern $p_s$ is, this time, XORed with a corresponding control bit pattern $p_c$, where the latter again depends on the hierarchical level from which the scrambled bit pattern originates. The bitwise XOR is a fast, simple operation that is typically directly supported by the processor. Normally, this operation is substantially faster than a multiplication/division, and sometimes even faster than an addition/subtraction.

Figure 2:
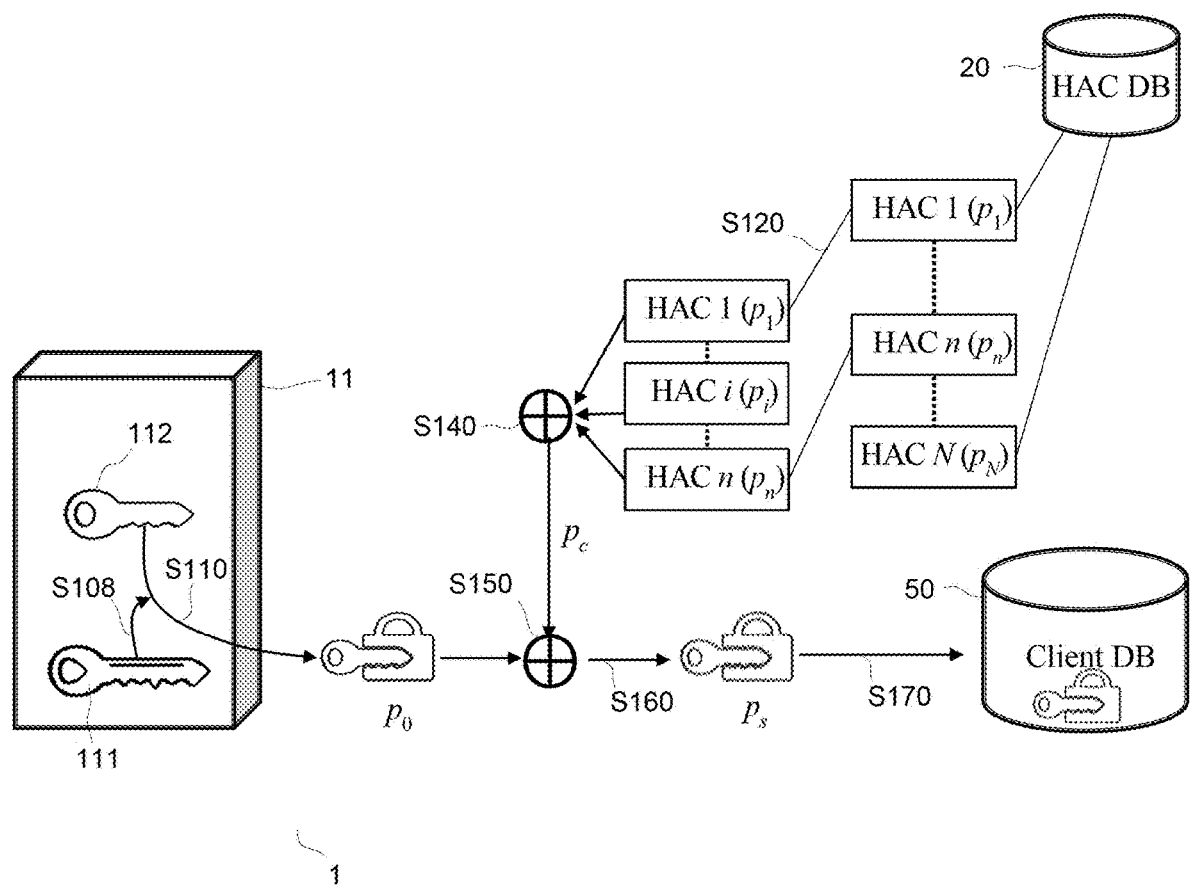
FIG. 2 is a block diagram schematically illustrating selected components of a hierarchical key management system as well as steps such as performed in the flowchart of FIG. 1, as involved in embodiments.

As illustrated in FIG. 2, the control bit pattern $p_c$ (used to scramble S150 the primary bit pattern $p_0$) is preferably obtained S120-S140 by computing an operation S140 on a number n of operands $p_1 \ldots p_n$. The number n of operands depends on the level $l_n$ of the hierarchy at which the CO is to be provided. More precisely, this number n is determined by the rank of said level $l_n$. In fact, the number n may typically be equal to the rank of the level $l_n$. This, however, depends on how the hierarchy is defined, the actual implementation and what keys are considered to form part of the hierarchy.

The operation performed at step S140 may for example be a mere hash function (or any pseudorandom function), designed to map n operands it uses as input to a bit pattern of a same length as said primary bit pattern $p_0$.

Another possibility is to rely again on a bitwise XOR operation, as mostly assumed in the following, without prejudice. The XOR function operates S140 this time on n same-length bit patterns $p_1 \ldots p_n$, where each of the patterns $p_1 \ldots p_n$ is a binary representation of a respective access code, which has a same length as said primary bit pattern $p_0$.

For example, where the client request is to provide a CO at the first level $l_1$ of the hierarchy, i.e., one level above the ground level $l_0$, then the HSM provides a binary representation of a (possibly encrypted/wrapped) CO as a primary bit pattern $p_0$. Next, $p_0$ is XORed with the control bit pattern $p_c$. Since here the CO need be provided at the first level $l_1$, a unique operand $p_1$ (a unique bit pattern) is involved to determine $p_c$ in this example. In fact, $p_c$ is equal to $p_1$ in that case, since the bitwise XOR operation applied to a unique bit pattern yields that same bit pattern.

As another example, if a request is made to provide a CO at the second level $l_2$ of the hierarchy, i.e., two levels above the ground level $l_0$, then the HSM provides a (possibly encrypted/wrapped) CO as a primary bit pattern $p_0$, which pattern $p_0$ is XORed with a control bit pattern $p_c$ that is now obtained by XORing two bit patterns, i.e., $p_1$ and $p_2$, respectively associated to levels $l_1$ and $l_2$. That is, $p_c = p_1 \oplus p_2$. And similarly, for a request to provide a CO at the third level, one uses $p_c = p_1 \oplus p_2 \oplus p_3$, and so on.

More generally, the operation S140 can be performed via any deterministic function of the n operands, which may but does not necessarily need to be reversible. As said, a pseudo-random function (e.g., as approved by the NIST) may be used. Another possibility is to use any function pair, where one function of this pair is doing the reverse operation of the other, etc. Preferred however, is to rely on the XOR function, as exemplified above, as the latter need already be implemented for scrambling the primary bit pattern. In all cases, the function used makes sure that the control bit pattern $p_c$ as eventually obtained has the same length as the primary bit pattern $p_0$.

As further illustrated in FIG. 2, the control bit pattern $p_c$ is preferably obtained by selecting S120 the needed n operands $p_1 \ldots p_n$ from a set of N potential operands, prior to the computation performed at step S140. The N potential operands are termed hierarchical access codes (or HACs). This selection depends on the level $l_n$ at which the CO is to be provided. As seen in FIG. 2, the initial set of N HACs from which the n operands are selected corresponds to respective levels $l_N, l_{N-1}, l_{N-2}, \ldots, l_1$, of the overall hierarchy.

The n operands preferably correspond to n same-length bit patterns $p_1 \ldots p_n$, should a bitwise XOR operation be used at step S140, in which case these operands are selected from a set of N same-length bit patterns corresponding to levels $l_N, l_{N-1}, l_{N-2}, \ldots, l_1$ of the overall hierarchy. As the rank of the level $l_n$ is less than or equal to the rank of the hierarch $l_N$ of said levels $l_N, l_{N-1}, l_{N-2}, \ldots, l_1$, i.e., $n \le N$, a subset of n bit patterns need be identified from the set of N bit patterns.

The system 1 may for instance comprise a database 20, meant to store the set of N HACs, as assumed in FIG. 2. The database 20 is accordingly termed HAC database in the following. While the N bit patterns may possibly be stored unencrypted thereon, additional security can easily be achieved by storing the HACs in an encrypted form on the HAC database 20.

The HACs may for instance correspond to initialization vectors (IVs), toggled according to a bitwise XOR operation. In that respect, the present methods may advantageously be implemented so as to conform to the so-called AES-GCM protocol (where AES and GCM respectively stand for Advanced Encryption Standard and Galois/Counter Mode). E.g., the HACs may be stored in the additional authenticated data (AAD) of the AES-GCM. This has the advantage that, access to the encrypted HAC database 20 is not required for decryption, while HACs can still be authenticated.

Note, the N bit patterns may possibly be stored (encrypted or not) together with a pointer pointing at the location of a next bit pattern. This way, accessing one of the N bit patterns makes it possible to sequentially access the next bit pattern. Such a solution makes it harder to steal the HACs, while still enabling an easy retrieval thereof from the system.

As evoked earlier, the CO to be provided (as per the request received S100) may for example be a cryptographic key, corresponding to a certain key level (as determined from the client request). In that case, the pattern $p_0$ accessed at step S110 shall preferably be a binary representation of a wrapped key, as assumed in FIG. 2 (padlocked key depictions denote wrapped keys in the accompanying drawings).

This representation is accessed S110 from the HSM 11. The accessed key 112 may possibly reside in wrapped form in the HSM and thus be directly available. In variants, and as illustrated in FIG. 2, the key 112 may only be available in plain form in the HSM, which therefore requires to first wrap S108 the key 112, using a lower-level key 111. The key 111 is assumed to be a master key available in plain form inside the HSM 11 in the example of FIG. 2. Note, however, that the lower-level key 111 may, in variants, first need be unwrapped, using a key further down in the hierarchy. That is, a hierarchical process may be required to wrap the key 112, as explained in the background section. Unwrapping/wrapping operations are performed in the HSM 11: key wrapping can be regarded as an export function, which allows a plain key 112 (residing in plain form in the HSM) to be exported from the HSM in a secure (wrapped) form.

While the initial access S110 to the primary bit pattern $p_0$ may indeed require wrapping/unwrapping operations (as in variants described above), the operation performed at step S150 is, itself, independent from any key residing in the HSM. I.e., the primary bit pattern $p_0$ is scrambled S150 independently from any key residing in plain in the HSM 11. That is, after the primary bit pattern $p_0$ was accessed S110 at the HSM, no additional operation (e.g., key unwraps) is required from the HSM, such that no interaction with the HSM is needed anymore.

Still, the binary representation of the CO accessed at step S110 shall preferably be a binary of a wrapped (or otherwise encrypted) version of this CO, such that the binary representation accessed can be safely provided S110 from the HSM 11 to an external entity (yet closely interacting with the HSM), for this entity to scramble S150 the primary bit pattern outside the HSM 11. In variants, however, the primary bit pattern can be scrambled S150 inside the HSM 11, using computational resources thereof.

In all cases, the scrambled pattern $p_s$ can then be provided S160 to, e.g., a requesting client 31-33, for it to store the scrambled bit pattern $p_s$ on an external database 50 (e.g., a client database, which is outside the HSM 11). In variants, the HSM (or, rather, a computerized entity closely interacting therewith) may directly instruct S170 to store the scrambled bit pattern $p_s$ on the external database 50 (e.g., a client database). Whenever the pattern $p_s$ is to be stored on an external database 50, the primary bit pattern should much preferably correspond to a CO that is initially encrypted (wrapped), for security reasons.

As evoked earlier, the HKMS 1 may possibly involve a complex hierarchy, involving several hierarchical paths (or sub-hierarchies), each subtended by respective master key levels of the HSMs. I.e., in embodiments, the HKMS 1 comprises two or more HSMs 11-13 (as in FIG. 5), where each of the HSMs institutes a key hierarchy extending from a ground level $l_0$ of a respective hierarchical path. In that case, steps S100-S150 can be concurrently performed for each respective hierarchical path (though the concurrent processes are likely asynchronous). That is, client requests may be concurrently received at a given levels of the respective hierarchical paths, according to which request COs need be provided at corresponding hierarchical levels above the ground levels $l_0$ of the various HSMs. Then, binary representations of the COs need be accessed at respective HSMs (as primary bit patterns), which are then scrambled via bitwise XOR operations, as described earlier.

So far, the description merely focused on the production and exportation of a scrambled CO. The following describes (in reference to FIGS. 3, 4) additional steps as performed upon receiving inbound scrambled objects (as in embodiments).

Assume that a request is received (at step S200, FIG. 3) from one of the clients (and at a given hierarchical level $l_m$ above the ground level $l_0$), which request involves S201-S204 a scrambled bit pattern $p_s$. Just like before, this scrambled bit pattern $p_s$ is a binary representation of a CO. Because this object has circulated outside of the HSM 11, it is preferably a binary representation of an encrypted version of this CO, for security reasons.

In that case, an inverse operation need be performed, which requires accessing a control bit pattern $p_c$. Again, the control bit pattern $p_c$ has the same length as the received pattern $p_s$ and is a binary representation of a given access code, which depends on the hierarchy. That is, the control bit pattern $p_c$ is obtained S220, S240 based on said given level $l_m$ of the hierarchy.

Having accessed the control bit pattern $p_c$, the scrambled pattern $p_s$ can be unscrambled S250 via a bitwise XOR operation, which like before, operates on both patterns $p_s$ and $p_c$. This way, an unscrambled bit pattern $p_0$ is obtained. If unscrambled outside the HSM 11, the unscrambled pattern $p_0$ is provided S260 to the HSM 11, for it to, e.g., store the pattern $p_0$ or somehow serve S270 the request received at step S200.

Various types of requests may be accordingly served. For example, a cryptographic operation may be performed S270 (as per the request received at step S200) at the HSM 11, whereby the unscrambled bit pattern $p_0$ is used as input to a cryptographic primitive (e.g., for a data encryption or decryption process).

Figure 4:
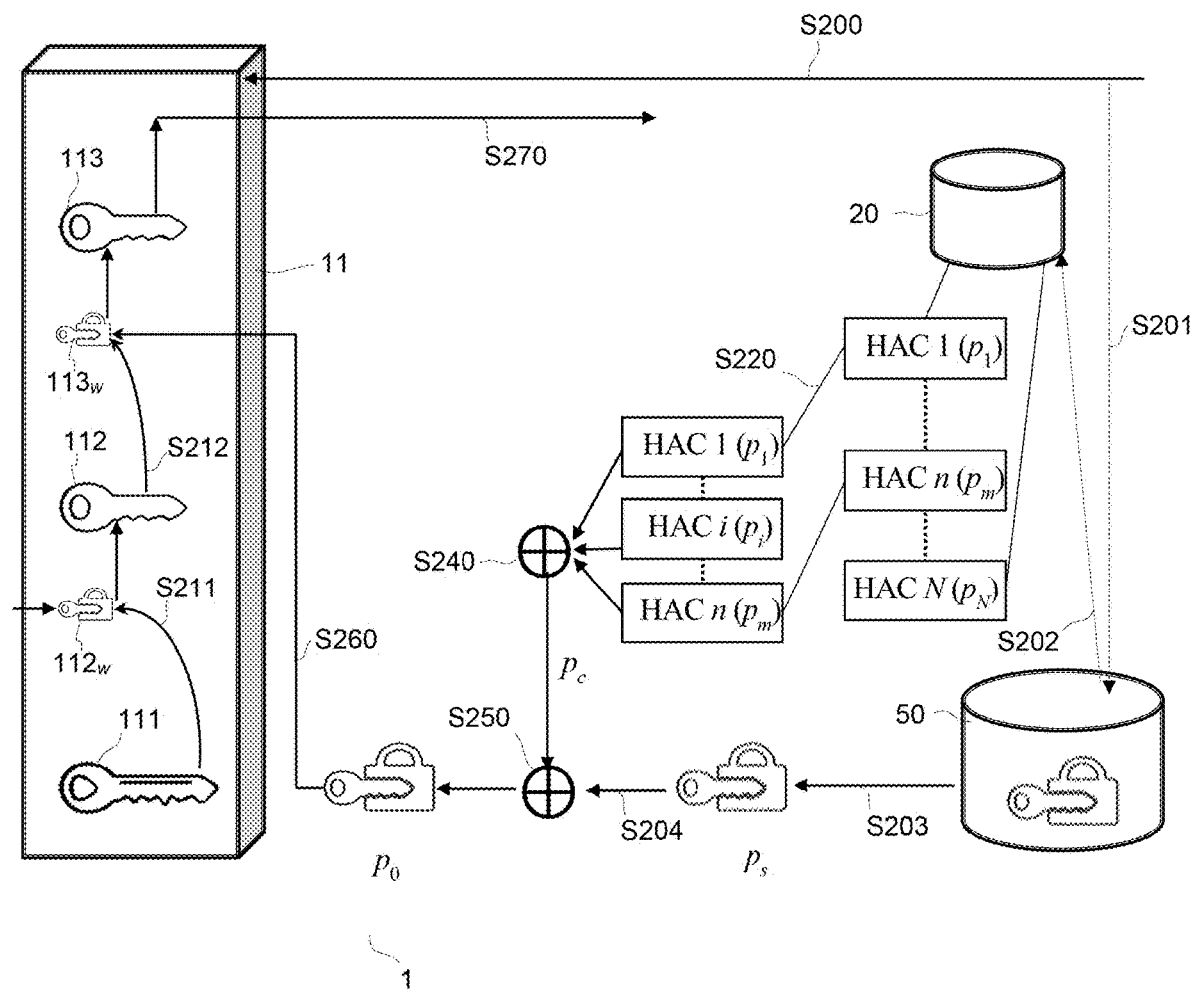
FIG. 4 shows a corresponding block diagram, which further illustrates a hierarchical key methodology used to unwrap a key corresponding to the unscrambled pattern, as involved in embodiments.

As explicitly depicted in FIG. 4, the operation S270 may first require a hierarchical key process S211-S212. For example, a low-level key 111 is used to unwrap S211 a wrapped key 112w, in order to obtain a plain key 112, which is in turn used to unwrap S212 the object 113w corresponding to the unscrambled bit pattern $p_0$ provided at step S260. This way, a plain key 113 is restored, in the HSM 11, which can then be used to serve S270 the initial client request S200.

As said above, the control bit pattern $p_c$ used at step S250 depends on the hierarchy. And as explained earlier in reference to FIGS. 1, 2, the control bit pattern $p_c$ may advantageously be computed S220, S240 using a deterministic, reversible function of a number n of operands $p_1 \ldots p_n$ that depends on the hierarchical level $l_m$ at which the request was received S200. In particular, the control bit pattern may be obtained S240 via a bitwise XOR operation operating on m same-length bit patterns $p_1 \ldots p_m$ (each being a binary representation of a respective access code of a same length as the second control bit pattern $p_c$ to be obtained). The number m of said bit patterns $p_1 \ldots p_m$ depends on said level $l_m$, e.g., on the rank of this level. And again, the m same-length bit patterns $p_1 \ldots p_m$ are preferably assigned to respective levels $l_m, l_{m-1}, l_{m-2}, \ldots, l_1$ of the hierarchy.

Figure 3:
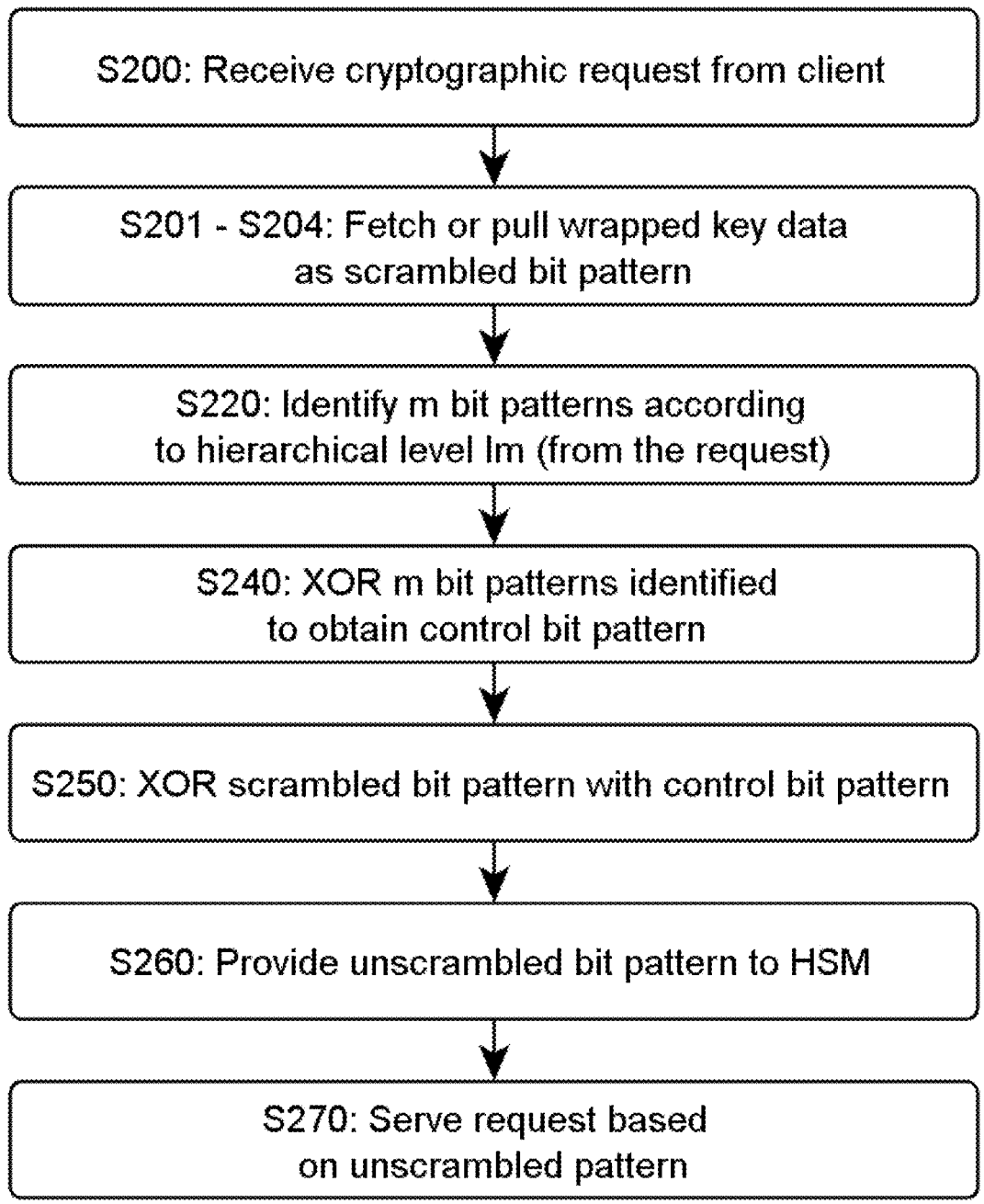
FIG. 3 is another flowchart illustrating high-level steps of a method, wherein a scrambled bit pattern $p_s$ is unscrambled (again via a bitwise XOR operation), to serve a client request, as in embodiments.

The initial steps S201-S204 shown in FIGS. 3, 4, whereby wrapped key data are fetched or pulled, correspond to a scenario, wherein, upon receiving the request S200, the database 50 is queried to provide S203 a CO stored thereon in a scrambled form, which is used S204 to the operation S250, while the HAC database 20 is concurrently queried S202 to perform a selection S220 of the n operands used as input to the operation S240, hence yielding the control pattern $p_c$ used as the other input to the operation S250.

Referring to FIG. 5, another aspect of the invention is now described, which concerns a computerized system 1 for managing COs. The system 1 shall typically be, e.g., a HKMS or a subsystem of a HKMS. Main aspects of such systems have already been discussed earlier, with reference to the present methods. Therefore, such systems are only briefly described in the following.

The system 1 comprises one or more HSMs 11-13 (preferably several HSMs), as well as clients 31-33 configured to interact with the set of HSMs 11-13, on behalf of users 80, as discussed earlier. Preferably, there is a one-to-one mapping between clients 31-33 and HSMs 11-13. I.e., one client 31-33 preferably interacts with one HSM at a time, be it to ease implementation and resource management. Other architectures can, however, be contemplated.

Each HSM 11 can again be regarded as instituting a respective key hierarchy that extends from a ground level $l_0$ of this hierarchy. The system 1 is generally configured to enable clients to interact with the HSM 11 in order to obtain such COs. The system 1 is otherwise equipped with suitable interfaces to receive client requests, according to which COs are to be provided at given levels $l_n$ of the hierarchy (above $l_0$). In turn, binary representations of the requested COs are accessed (as primary bit patterns $p_0$ at the HSMs 11-13, for computerized entities (which are not necessarily the HSMs themselves) of the system 1 to scramble the primary bit patterns accessed. Such entities must accordingly be configured to perform bitwise XOR operations as described earlier in reference to FIGS. 1-4. In FIGS. 2 and 4, the (un)scrambling operations S150, S250 are assumed to be performed outside the HSM 11.

The computerized clients 31-33 may for instance have access to respective external storage media 41-43. The external storage media 41-43 are, e.g., attached to or in close data communication with the clients 31-33. Such media 41-43 still reside in the client space (and not in the users' space), where COs can still be relatively safely stored, as assumed in FIG. 5. The external storage media 41-43 may for instance include, each, a database (as denoted by numeral reference 50 in FIGS. 2 and 4). Again, other architectures can be contemplated.

Still referring to FIGS. 2, 4, the system 1 may further comprise a HAC database 20, storing a set of N same-length bit patterns corresponding to respective levels $l_N$, $l_{N-1}$, $l_{N-2}$, ..., $l_1$ of the hierarchy. This way, a control bit pattern $p_c$ may be obtained via an operation (e.g., a bitwise XOR operation) operating on a number n of bit patterns selected from the N bit patterns based on the hierarchical level $l_n$ corresponding to the request, as explained earlier. I.e., the n selected bit patterns correspond to respective levels $l_n$, $l_{n-1}$, $l_{n-2}$, ..., $l_1$ of the hierarchy. Similarly, where multiple hierarchical paths are involved, the database 20 may store respective sets of same-length bit patterns, from which selections of subsets of bit patterns can be performed.

The storage of the various (wrapped) keys 112$w$, 113$_w$, as obtained in embodiments (e.g., at steps S211, S212) may possibly be outsourced (by each HSM concerned) to external storage media 41-43. E.g., the wrapped keys may be directly supplied upon wrapping or temporarily retained in the cache of the HSMs, prior to being supplied to requesting users/clients, e.g., to accommodate current network traffic conditions. In all cases, the clients 31-33 preferably replicate the wrapped keys, or maintain identifiers thereof. Yet, the corresponding (unwrapped) keys can later be identified, if necessary, e.g., using a local mapping to key handles stored on the HSMs. Incidentally, we note that the terminology "unwrapped" is here used to denote keys that are in unwrapped or non-wrapped form.

Next, according to a final aspect, the invention can be embodied as a computer program product for managing COs in a HKMS 1 such as described above. This computer program product comprises a computer readable storage medium having program instructions embodied therewith, where the program instructions are executable by one or more processors, to cause the latter to take steps according to the present methods. Aspects of the present computer programs are discussed in detail in sect. 2.2.

This program may for instance be run at the clients and the HSMs (in a delocalized fashion), or at specific nodes (e.g., the HSMs). In addition, this program may possibly involve a controller authorized to interact with the HSMs or with both the clients and HSMs. Many possible architectures can be contemplated, as the person skilled in the art will appreciate.

The above embodiments have been succinctly described in reference to the accompanying drawings and may accommodate a number of variants. Several combinations of the above features may be contemplated. For example, in embodiments, a key hierarchy is relied on, which use hierarchy access codes (HACs) to replace the traditional sequential key hierarchy by parallel implementation of the hierarchy, orthogonally to keys. Such HACs are further used to scramble wrapped keys via bitwise XOR operation exoring binary representations of such keys with the HACs to create arbitrarily deep hierarchies, yet without touching the principle of having "tenant" keys (to ensure compatibility with so-called "bring your own encryption", BYOE, or "Bring your own key", BYOK). The HACs are optionally encrypted. The key material can possibly be scrambled outside the HSM or inside the HSM.

2. Specific Embodiments—Technical implementation details 2.1 Cloud implementations It is to be understood that although this disclosure refers to embodiments involving cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

2.2 Systems, methods and computer program products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for managing cryptographic objects in a hierarchical key management system comprising a hardware security module, or HSM, which institutes a key hierarchy extending from a ground $l_0$ of this hierarchy, wherein the system enables clients to interact with the HSM in order to obtain such cryptographic objects, the method comprising:

receiving a request from at least one of the clients, according to which request a cryptographic object is to be provided at a given level $l_n$ of the hierarchy above the ground level $l_0$;

accessing, at the HSM, a binary representation of a cryptographic object as a primary bit pattern $p_0$;

scrambling said primary bit pattern via a bitwise XOR operation operating, on the one hand, on the primary bit pattern $p_0$ accessed and, on the other hand, on a control bit pattern $p_c$ that is a binary representation of an access code of a same length as said primary bit pattern $p_0$, wherein the control bit pattern $p_c$ is obtained based on that given level $l_n$ of the hierarchy, to serve the request received and thereby provide the at least one of the clients with the requested cryptographic object;

receiving, from one of the clients, a second request involving a second scrambled bit pattern $p_s$ at a given level $l_m$ of the hierarchy above the ground level $l_0$, wherein the second scrambled bit pattern $p_s$ is a binary representation of an encrypted version of a second cryptographic object, accessing a second control bit pattern $p_c$ of a same length as the second scrambled bit pattern $p_s$, wherein the second control bit pattern $p_c$ is a binary representation of a second access code, obtained based on that given level $l_m$ of the hierarchy;

unscrambling the second scrambled bit pattern $p_s$ via a bitwise XOR operation operating, on the one hand, on the second scrambled bit pattern $p_s$ and, on the other hand, on the second control bit pattern $p_c$, to obtain an unscrambled bit pattern $p_0$; and providing the unscrambled bit pattern $p_0$ to the HSM, to serve the second request received and thereby provide the one of the clients with the second requested cryptographic object.

2. The method according to claim 1, wherein the method further comprises, prior to scrambling the primary bit pattern $p_0$:

obtaining said control bit pattern $p_c$ by computing an operation on a number n of operands $p_1 \ldots p_n$ that depends on said given level $l_n$ of the hierarchy, wherein said operation involves a deterministic function of the n operands.

3. The method according to claim 2, wherein said deterministic function is a pseudorandom function, designed to map n operands it uses as input to a bit pattern of a same length as said primary bit pattern $p_0$.

4. The method according to claim 2, wherein said deterministic function is a bitwise XOR operation operating on n same-length bit patterns $p_1 \ldots p_n$, each being a binary representation of a respective access code of a same length as said primary bit pattern $p_0$.

5. The method according to claim 2, wherein obtaining said control bit pattern $p_c$ further comprises
selecting, based on said given level $l_n$ of the hierarchy, then operands $p_1 \ldots p_n$ from a set of N operands corresponding to respective levels $l_N, l_{N-1}, l_{N-2}, \ldots, l_1$ of the hierarchy.

6. The method according to claim 5, wherein the hierarchical key management system further comprises a database, storing the set of N operands.

7. The method according to claim 6, wherein the N operands are stored in an encrypted form on the database.

8. The method according to claim 1, wherein the cryptographic object to be provided is, as per the request received, one of: a cryptographic key, and an initialization vector.

9. The method according to claim 8, wherein the cryptographic object to be provided is, as per the request received, a cryptographic key, and accessing said binary representation comprises accessing a binary representation of a wrapped cryptographic key from the HSM as said primary bit pattern $p_0$.

10. The method according to claim 1, wherein said primary bit pattern $p_0$ is scrambled independently from any key residing in plain in the HSM.

11. The method according to claim 10, wherein:
the binary representation of the cryptographic object accessed as said primary bit pattern $p_0$ at the HSM is a binary representation of an encrypted version of said cryptographic object; and
the binary representation accessed is provided from said HSM, so as for the primary bit pattern to be scrambled outside the HSM.

12. The method according to claim 1, wherein the method further comprises: instructing to store the scrambled bit pattern $p_s$ on a database, external to said HSM.

13. The method according to claim 1, wherein said primary bit pattern is scrambled inside the HSM.

14. The method according to claim 1, wherein the method further comprises
performing, as per the second request received, a cryptographic operation at said HSM, whereby the unscrambled bit pattern $p_0$ is used as input to a cryptographic primitive for one of: a data encryption and a data decryption.

15. The method according to claim 14, wherein the method further comprises, prior to accessing the second control bit pattern $p_c$:
obtaining the second control bit pattern via a bitwise XOR operation operating on m same-length bit patterns $p_1 \ldots p_m$, each being a binary representation of a respective access code of a same length as the second control bit pattern $p_c$ to be obtained, wherein the number m of said same-length bit patterns $p_1 \ldots p_m$ depends on said given level $l_m$, of the hierarchy.

16. A computer-implemented method for managing cryptographic objects in a hierarchical key management system comprising tow or more hardware security modules, or HSMs, each of the HSMs instituting a respective key hierarchy extending from a ground level $l_0$ of this respective hierarchy, wherein the system enables clients to interact with the HSMs in order to obtain such cryptographic objects, the method comprising:
receiving a request from at least one of the clients, according to which request a cryptographic object is to be provided at a given level $l_n$ of the hierarchy above the ground level $l_0$,
accessing, at the HSM, a binary representation of a cryptographic object as a primary bit pattern $p_0$; and
scrambling said primary bit pattern via a bitwise XOR operation operating, on the one hand, on the primary bit pattern $p_0$ accessed and, on the other hand, on a control bit pattern $p_c$ that is a binary representation of an access code of a same length as said primary bit pattern $p_0$, wherein the control bit pattern $p_c$ is obtained based on that given level $l_n$ of the hierarchy, to serve the request received and thereby provide the at least one of the clients with the requested cryptographic object;
wherein the method further comprises, for each hierarchy of said respective hierarchies of the system:
receiving a request from one of the clients, according to which request a cryptographic object is to be provided at a given level $l_n$ of said each hierarchy above a respective ground level $l_0$ of a respective HSM;
accessing, at said respective HSM, a binary representation of a cryptographic object as a primary bit pattern $p_0$; and
scrambling the primary bit pattern accessed at the respective HSM via a bitwise XOR operation operating, on the one hand, on the primary bit pattern accessed by the respective HSM and, on the other hand, on a control bit pattern $p_c$ that is a binary representation of an access code of a same length as said primary bit pattern $p_0$, wherein the control bit pattern $p_c$ is obtained based on that given level $l_n$ of said each hierarchy.

17. A computerized system for managing cryptographic objects, the system comprising a hardware security module, or HSM, which institutes a key hierarchy extending from a ground level $l_0$ of this hierarchy, wherein the system is configured to:
enable clients to interact with the HSM in order to obtain such cryptographic objects;
receive a request from at least one of the clients, according to which request a cryptographic object is to be provided at a given level $l_n$ of the hierarchy above the ground level $l_0$;
access, at the HSM, a binary representation of a cryptographic object as a primary bit pattern $p_0$;
scramble said primary bit pattern via a bitwise XOR operation operating, on the one hand, on the primary bit pattern $p_0$ accessed and, on the other hand, on a control bit pattern $p_c$ that is a binary representation of an access code of a same length as said primary bit pattern $p_0$, wherein the control bit pattern $p_c$ is obtainable based on that given level $l_n$ of the hierarchy, to serve the request received, in operation of the system, and thereby provide the at least one of the clients with the requested cryptographic object;
receive, from one of the clients, a second request involving a second scrambled bit pattern $p_s$ at a given level $l_n$, of the hierarchy above the ground level $l_0$, wherein the second scrambled bit pattern $p_s$ is a binary representation of an encrypted version of a second cryptographic object, access a second control bit pattern $p_c$ of a same length as the second scrambled bit pattern $p_s$, wherein the second control bit pattern $p_c$ is a binary representation of a second access code, obtained based on that given level $l_m$, of the hierarchy;

unscramble the second scrambled bit pattern $p_s$ via a bitwise XOR operation operating, on the one hand, on the second scrambled bit pattern $p_s$ and, on the other hand, on the second control bit pattern $p_c$, to obtain an unscrambled bit pattern $p_0$; and provide the unscrambled bit pattern $p_0$ to the HSM, to serve the second request received and thereby provide the one of the clients with the second requested cryptographic object.

18. The computerized system according to claim 17, wherein the system further comprises a database, the latter storing a set of N same-length bit patterns corresponding to respective levels $l_N$, $l_{N-1}$, $l_{N-2}$, ..., $l_1$ of the hierarchy, and wherein the system is further configured to obtain said control bit pattern $p_c$ via a bitwise XOR operation operating on a number n of bit patterns selected from the N bit patterns based on said given level $l_n$, so as for then selected bit patterns to correspond to respective levels $l_n$, $l_{n-1}$, $l_{n-2}$, ..., $l_1$ of the hierarchy.

19. A computer program product for managing cryptographic objects in a hierarchical key management system comprising a hardware security module, or HSM, which institutes a key hierarchy extending from a ground $l_0$ of this hierarchy, wherein the system enables clients to interact with the HSM in order to obtain such cryptographic objects, the computer program product comprising a computer readable storage medium having program instructions embodied therewith, the program instructions executable by one or more processors, to cause to:

access a request from at least one of the clients, according to which request a cryptographic object is to be provided at a given level $l_n$ of the hierarchy above the ground $l_0$;

access, at the HSM, a binary representation of a cryptographic object as a primary bit pattern $p_0$;

scramble said primary bit pattern via a bitwise XOR operation, wherein the later operates, on the one hand, on the primary bit pattern accessed and, on the other hand, on a control bit pattern $p_c$ that is a binary representation of an access code of a same length as said primary bit pattern $p_0$, wherein the control bit pattern is obtainable based on that given level $l_n$ of the hierarchy, to serve the request received and thereby provide the at least one of the clients with the requested cryptographic object;

receive, from one of the clients, a second request involving a second scrambled bit pattern $p_s$ at a given level $l_m$, of the hierarchy above the ground level $l_0$, wherein the second scrambled bit pattern $p_s$ is a binary representation of an encrypted version of a second cryptographic object, access a second control bit pattern $p_c$ of a same length as the second scrambled bit pattern $p_s$, wherein the second control bit pattern $p_c$ is a binary representation of a second access code, obtained based on that given level $l_m$, of the hierarchy;

unscramble the second scrambled bit pattern $p_s$ via a bitwise XOR operation operating, on the one hand, on the second scrambled bit pattern $p_s$ and, on the other hand, on the second control bit pattern $p_c$, to obtain an unscrambled bit pattern $p_0$; and provide the unscrambled bit pattern $p_0$ to the HSM, to serve the second request received and thereby provide the one of the clients with the second requested cryptographic object.

* * * * *